(12) United States Patent
Bessette

(10) Patent No.: US 7,610,839 B1
(45) Date of Patent: Nov. 3, 2009

(54) GUIDE FOR THE PRECISE CONTROL OF PORTABLE POWER TOOLS

(76) Inventor: Bernard J. Bessette, 1306 Forest Hill Dr., Aiken, SC (US) 29801

( * ) Notice: Subject to any disclaimer, the term of this patent is extended or adjusted under 35 U.S.C. 154(b) by 263 days.

(21) Appl. No.: 11/515,527

(22) Filed: Sep. 5, 2006

Related U.S. Application Data

(63) Continuation-in-part of application No. 10/303,538, filed on Nov. 25, 2002, now abandoned.

(51) Int. Cl.
*B26D 5/00* (2006.01)
(52) U.S. Cl. .............. 83/743; 83/745; 83/454; 83/485; 30/373; 30/375
(58) Field of Classification Search .......... 83/745, 83/454, 574, 571, 698.11, 486.1, 743, 483, 83/485, 486, 487; 30/373, 375, 374
See application file for complete search history.

(56) References Cited

U.S. PATENT DOCUMENTS

| | | | |
|---|---|---|---|
| 1,700,189 A * | 1/1929 | Wikstrom ................ 30/376 |
| 1,911,045 A | 5/1933 | Tinnen | |
| 2,677,399 A | 5/1954 | Getsinger ................ 143/6 |
| 2,735,455 A | 2/1956 | Forsberg ................ 143/6 |
| 3,570,562 A * | 3/1971 | Tracy ................ 83/485 |
| 3,979,987 A * | 9/1976 | Mayhew et al. ........... 83/745 |
| 4,059,038 A | 11/1977 | Rietema ................ 83/745 |
| 4,077,292 A | 3/1978 | Cole ................ 83/745 |
| 4,335,512 A * | 6/1982 | Sheps et al. ............ 30/376 |
| 4,356,748 A | 11/1982 | Tilton ................ 83/745 |
| 4,463,644 A | 8/1984 | Ferdinand et al. ........ 83/745 |
| 4,522,098 A | 6/1985 | Bliss ................ 83/745 |
| 4,628,608 A | 12/1986 | Kuhlmann et al. .......... 30/373 |
| 4,751,865 A | 6/1988 | Buckalew ............ 83/745 |
| 4,790,072 A * | 12/1988 | Edwards ................ 30/376 |
| 4,947,910 A | 8/1990 | Reneau ................ 144/371 |
| 4,957,024 A * | 9/1990 | Albrecht ................ 83/471.3 |
| 5,035,061 A | 7/1991 | Bradbury et al. .......... 33/430 |
| 5,815,931 A | 10/1998 | Cleveland ................ 30/373 |
| 5,964,041 A | 10/1999 | Daniel ................ 33/403 |
| 6,079,309 A | 6/2000 | Molburg ................ 83/745 |
| 6,101,729 A | 8/2000 | Stringari ................ 33/474 |
| 6,173,631 B1 | 1/2001 | Schock ................ 83/13 |
| 6,216,355 B1 | 4/2001 | Darnell ................ 33/630 |
| 6,591,509 B2 | 7/2003 | LeBlanc ................ 30/374 |

* cited by examiner

*Primary Examiner*—Boyer D Ashley
*Assistant Examiner*—Omar Flores-Sánchez
(74) *Attorney, Agent, or Firm*—Daniel C. Leonardi; Nexsen Pruet, LLC

(57) ABSTRACT

A tool trolley or guide for the precise control of hand held power tools such as a circular saw, saber saw, router or other portable power tool to guide the tool along a straight guide path. A chassis upon which the power tool is attached has a trolley like connection with a guide rail releasably secured to a work piece. The chassis has an opening through which the cutters of the tool extend. Tools are mounted on mounting plates which in turn are releasably mounted on the chassis.

14 Claims, 13 Drawing Sheets

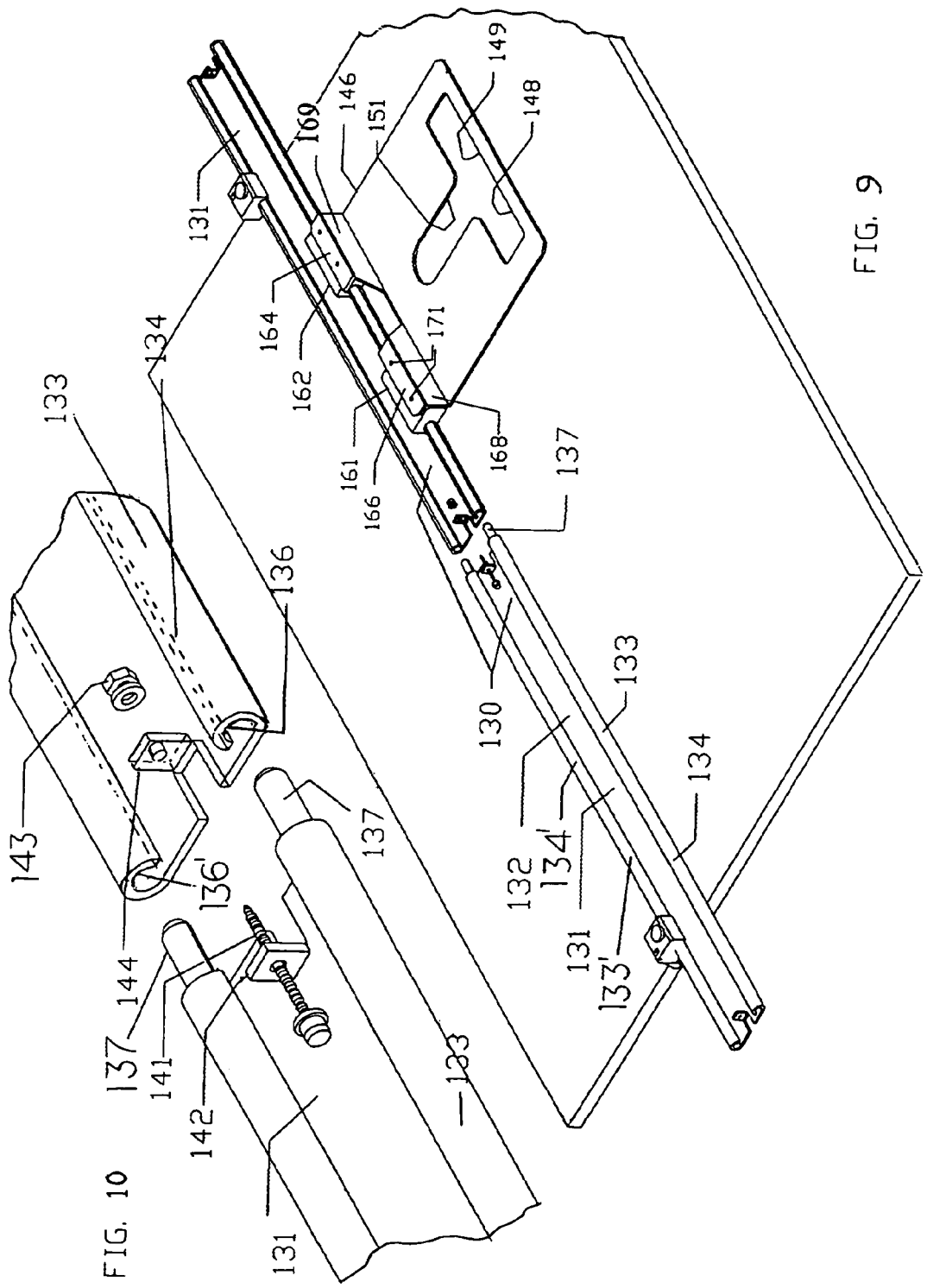

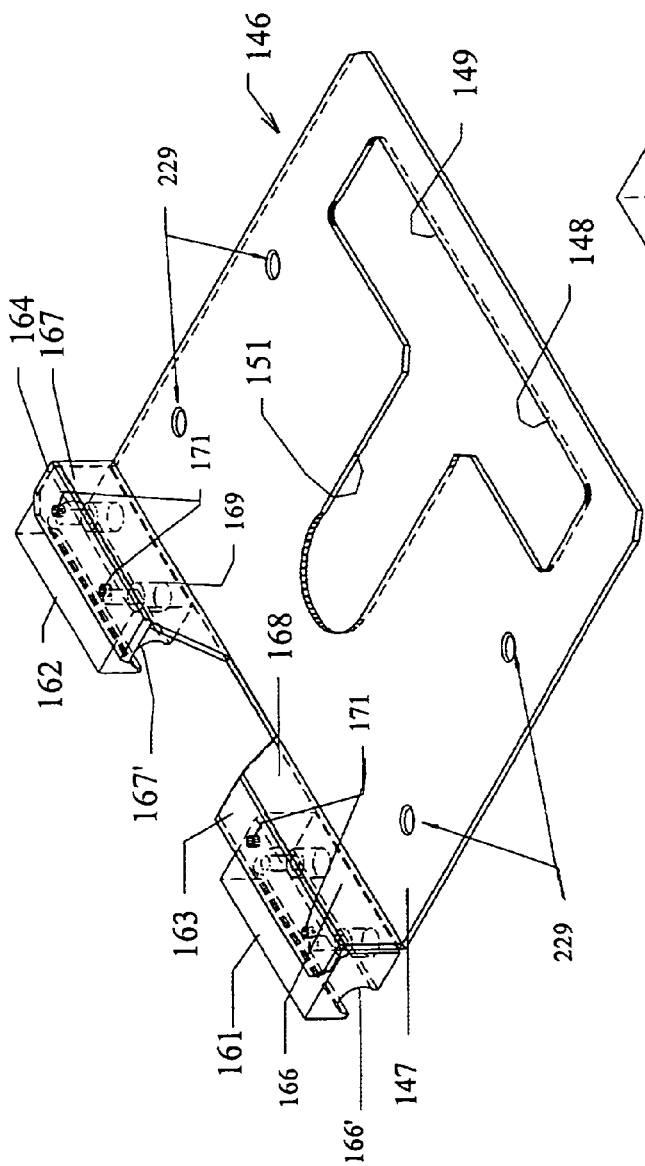
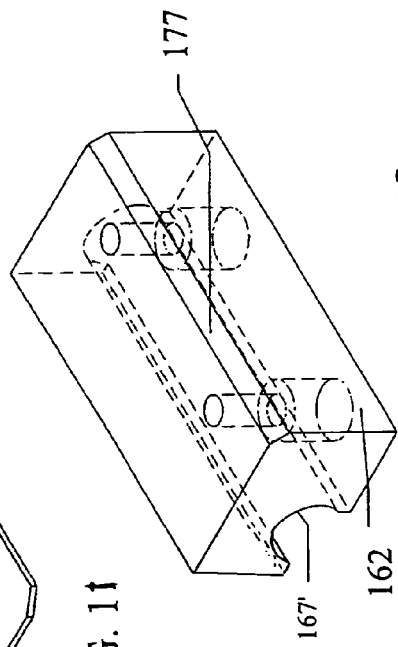
FIG. 12
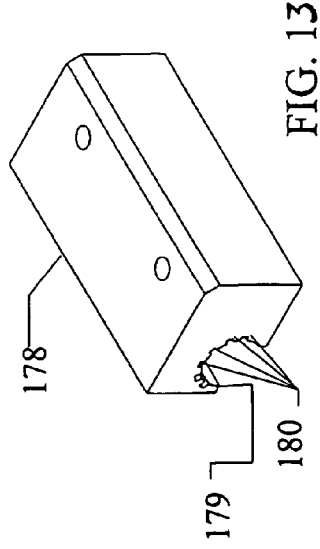
FIG. 13

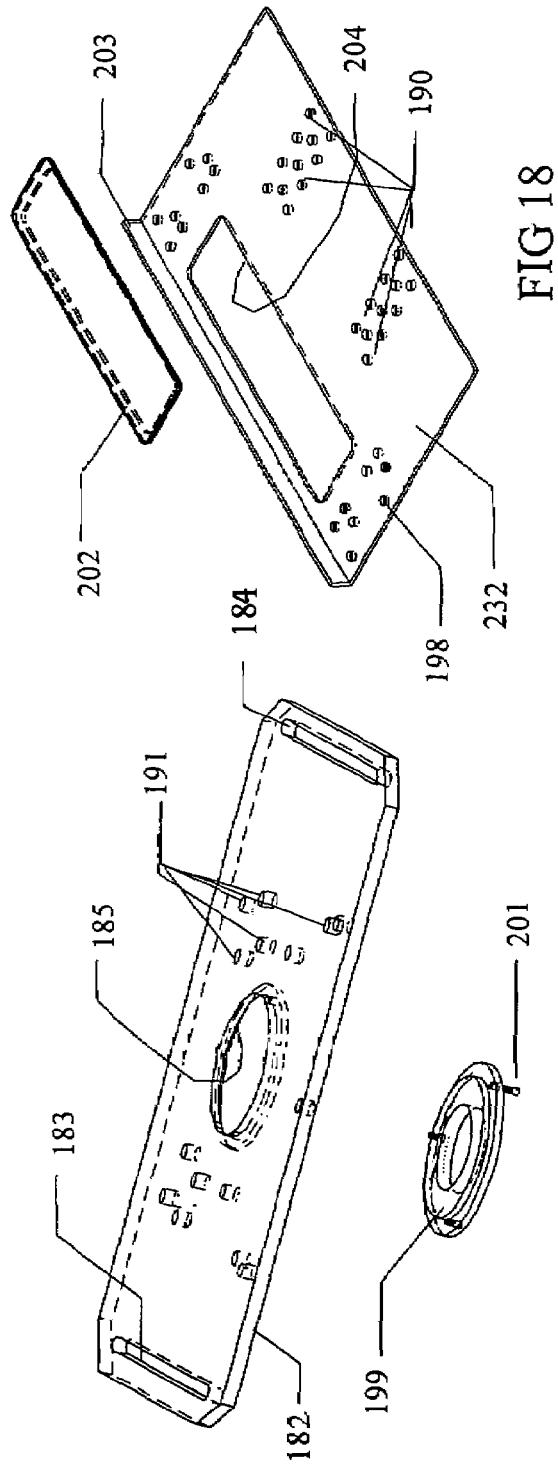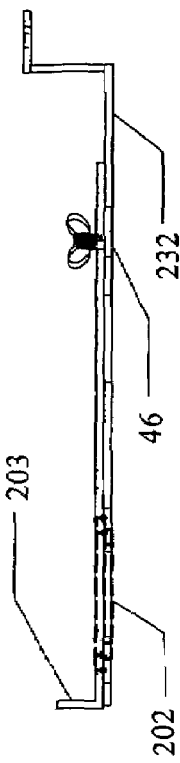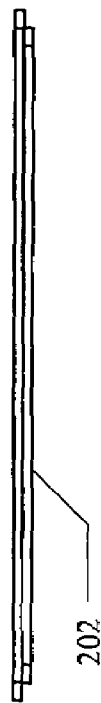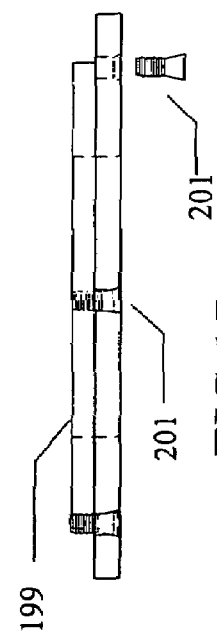

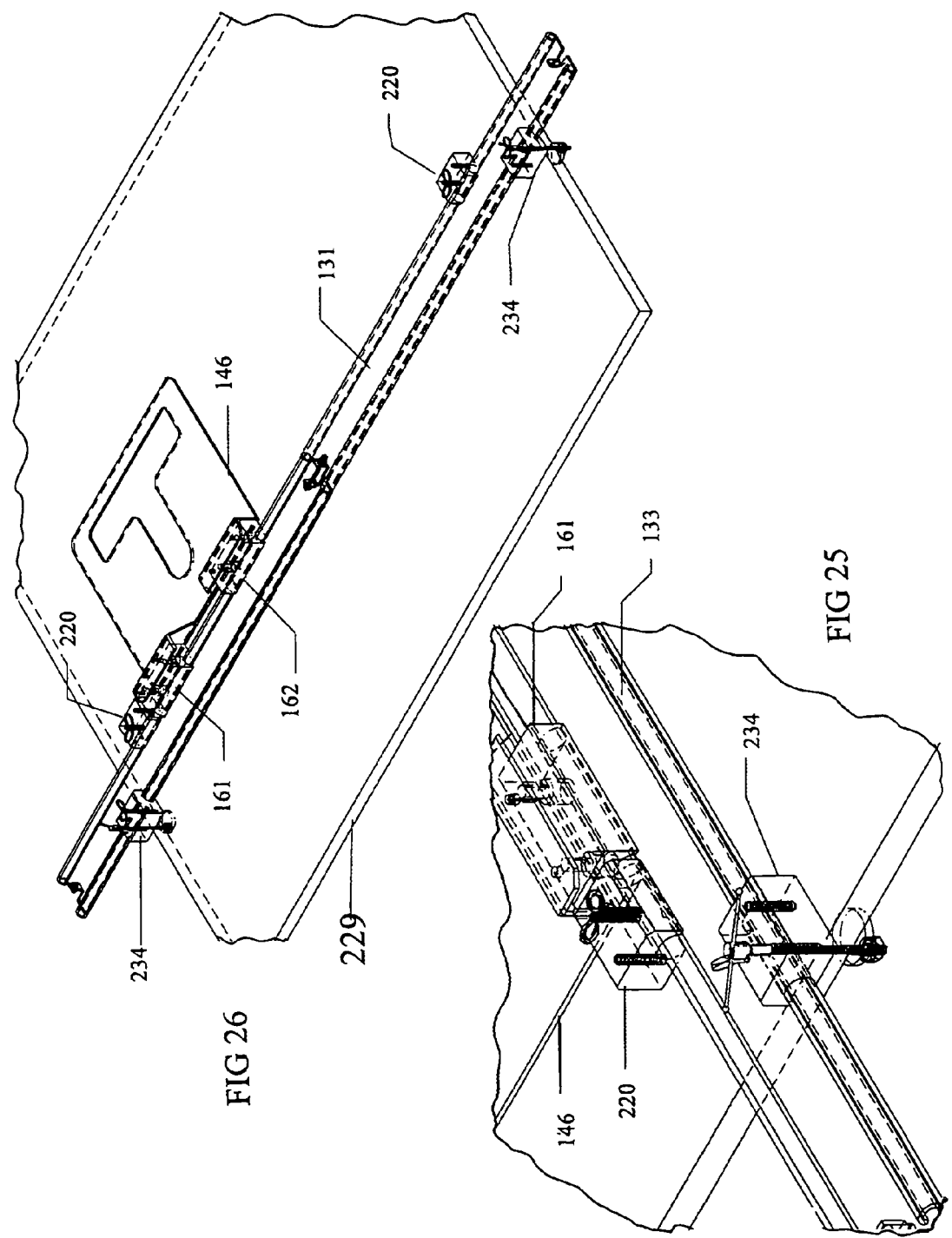

GUIDE FOR THE PRECISE CONTROL OF PORTABLE POWER TOOLS

RELATED APPLICATIONS

This application is a continuation-in-part of U.S. patent application Ser. No. 10/303,538 filed Nov. 25, 2002 now abandoned for a Tool Trolley Guide for the Precise Control of Portable Power Tools.

BACKGROUND OF THE INVENTION

Power tools such as circular saws, saber saws and routers are used for cutting, ripping, plowing rabbets and dados and shaping wood and other materials. Each of these tools require the operator to have firm control of the tool and unobstructed view of the cut-line in order to produce a straight and accurate cut along a prescribed cut-line during operation. All of these tools produce significant amounts of sawdust that obscures the cut-line. In addition, any variation in the amount of force applied to the tool as well as normal wear factors such as dulling of saw teeth or cutter edges and varying alignment in the teeth of the saw blades, causes the cutter or blade to drift resulting in binding, kickbacks and errant cuts. In addition, the operator is prone to human error caused by fatigue or distraction resulting in a tool deviating from its cut-line causing binding and kickback or simply an errant cut producing unwanted waste.

A variety of fixtures and saw guides have been proposed to address the before mentioned problems but they have deficiencies and limitations including:

A. Complex and intricate designs that involve many parts, are cumbersome to use, expensive to manufacture and generally not practical for the average woodworker, B. Attachment mechanisms that do not restrain the tool base securely and are susceptible to vibrating loose creating a potential for binding, kickback and danger to the operator.

C. Attachment mechanisms that do not lock the tool base in alignment with the cut-line requiring constant attention to the alignment setting of the tool in the saw guide, D. Clamping mechanisms designed to secure the guide rail to the workpiece that are complex and limited in their application, E. Movement of the tool guide along the guide path is subject to binding and restriction due to collection of sawdust and debris, F. The tool guide does not adequately restrict lateral or radial movement of the tool on the workpiece, G. The support by the tool guide does not prevent the tool from tilting while in use, which gives rise to binding or kick-back, H. The length of the guide rail unduly limits the length of cut.

U.S. Pat. No. 4,059,038 uses a complex frame of multilayer construction that sandwiches a guide piece consisting of a consumable piece of compressed board that forms the reference edge. The guide rail incorporates a trough that a guide plate slides in and the guide plate attaches to tool base with hand-tightened bolts or wing nuts in slots cut in the guide plate. The trough is uncovered and is a collection point for sawdust that can result in binding and restricted movement of the guide plate longitudinally through the trough. The wingnut attachment mechanism does not ensure a secure fit or precise alignment of the tool to the cut-line. The margin between the slot and the bolt/wing-nut that fastens the saw to the guide plate has freedom of movement that can result in the saw being misaligned to the cut-line. The saw base overhangs the guide plate enabling the saw to tilt during operation resulting in binding and kick back. This can occur as the trough fills with sawdust and the saw guide begins to ride atop of the sawdust tilting the saw. The alternative L-shaped guide rail provides a rigid straight edge along which the base of the saw is manually held during cutting, however, it does not restrict lateral movement of the saw drifting away from the rail that is caused by variation in saw tooth set or dullness of the saw blade or lateral forces applied by the operator.

U.S. Pat. No. 4,335,512 uses complex design involving a pair of elongated ball bearing telescoping slides, a plate to attach the circular saw to the slide assembly, a spring loaded take-up spool that limits the length of travel and a protractor fence. The travel length of the saw is limited to approximately twice the length of the slide rails, which for practical reasons is more appropriate for shorter cuts. The elaborate rail within a rail configuration forms a raceway that contains a ball bearing assembly. The raceway when fully extended to begin a cut exposes the lower portion of the rail assembly that is U-shaped and is a collection point for sawdust. The ball bearing guide assembly that attaches the upper half of the rail to the lower half of the rail operates on a close tolerance and will be severely impacted by the collection of sawdust within the rail assembly. Also, when the spring loaded tape is taken up by the spool, it will entrain sawdust that will cause binding of that mechanism. The attachment mechanism, while designed to keep the base of the circular saw close to the workpiece to maximize the saw's depth of cut, has elongated slots and bolt/wing-nuts to fasten the saw base to the guide rail and has freedom of movement. The normal use and vibrations caused by the operation of the saw can cause the saw to become misaligned resulting in binding and possible kickback.

U.S. Pat. No. 4,522,098 incorporates a complex and intricate design that includes an integrated adjustable cam locking mechanism, a surface for the saw to ride upon and a raised edge, which the saw is held against during operation.

U.S. Pat. No. 5,964,041 shows a guide tool similar to that of U.S. Pat. No. 4,522,098 with similar disadvantages and deficiencies.

U.S. Pat. No. 6,101,729 incorporates an elaborate frame and an unconventional mechanism to lock the frame onto a workpiece, using non-slip surfaces, adjustment blocks and cap-screws. The frame has a raised edge that the saw base is held against during operation. The saw base is not captured by the saw guide, thus; it does not restrict lateral movement of the saw away from the rail creating a potential for binding or kick-back as well as the potential for the saw base to tilt as it moves away from the raised edge and off of the frame supporting the saw. The width of the frame is such that the initial cut with the saw cuts off the excess portion of the frame that then establishes the reference edge for future cuts. This approach at establishing a reference edge has limitations, however. If a beveled cut is made with the saw, the reference edge is altered rendering it useless for further cuts with the saw blade aligned vertically.

U.S. Pat. No. 5,815,931 discloses an L shaped frame that partially captures the saw base which supports a pair of perpendicular guide arms. The primary guide arm extends laterally from the guide plate and is used to guide the saw along the cut-line by tracking against the edge of the workpiece. The second guide arm is perpendicular to the first and extends longitudinally from the guide plate and serves to limit the length of travel and therefore the length of the cut. The guide plate partially captures the saw base enabling the saw to tilt while operating causing binding and kickback. The guide plate is attached to the saw base with tensioning screws that can vibrate loose. The guide plate does not capture a guide rail or a separate straight edge but relies on the workpiece having a straight edge that forms the reference edge, consequently cannot be used on a workpiece that does not have a finished or joined edge or for making angle cuts that are not parallel to the reference edge. The guide arms do not restrict lateral movement of the saw in the direction of the reference edge of the workpiece enabling the saw to deviate off the cut-line. The width of the cut is limited by the practical length of the guide arms. In order to rip down the center of a sheet of plywood, the guide arm would have to be in excess of 24" long, allowing for the end of the guide arm that is captured by guide plate. This would result in the drag forces acting between the reference edge of the workpiece and the guide arm to create a radial force with the end of the guide rail contacting the reference edge of the workpiece acting as the pivot point. This would cause the tool to turned into the workpiece causing binding and kickback. Collection of saw dust in front of the guide plate and guide arms will restrict the movement of the saw guide and will further exacerbate the drag and pivotal reaction of the guide arm against the reference edge causing a rotational force that can result in binding and kickbacks.

U.S. Pat. No. 6,079,309 discloses a guide rail with an integral clamping assembly, and with the saw base attached to the guide rail using a single point attachment bar that rides atop of the guide rail. The guide rail and attachment bar that rides atop of the guide rail are susceptible to sawdust collecting on the rail and impacting the freedom of movement along the longitudinal path. The attachment bar captures the guide rail and attaches to the front of the saw under tension from one screw. The tool base is not fully captured by the attachment mechanism and with the single point contact it is susceptible to vibrating loose. With the attachment bar secured only in the forward position of the saw base, the saw can rotate away from the guide rail upon application of a lateral force. During operation, the major component of force is applied to the tool in the longitudinal direction along the cut-line; however, with an operator positioned along side of the tool during operation, a nominal lateral force is to be expected.

The guide tool of U.S. Pat. No. 6,101,729 uses an L shaped guide forming a perpendicular set of rails that facilitate the cross cutting of lumber. Such a tool guide has very limited applications, facilitating cross cutting operations only. The guide is essentially a pair of perpendicular rails or straight edges along which the base of the saw is manually held during cross cutting and it does not restrict lateral movement of the saw away from the rail that can result in binding or kickback.

U.S. Pat. No. 6,173,631 use a frame having raised edge that the saw base is held against during operation. Saw base is not captured by the saw guide, thus; does not restrict lateral movement of the saw away from the rail creating a potential for binding or kick-back. The width of the frame is such that the initial cut with the saw cuts off the excess portion of the frame that then establishes the reference edge for future cuts. This approach at establishing a reference edge has limitations, however. If a beveled cut is made with the saw, the reference edge is altered rendering it useless for future cuts.

The saw guide of U.S. Pat. No. 6,216,355 uses a calibrated scale that attaches to the front of the saw and a guide pin that tracks upon one straight edge of the workpiece. The guide does not capture a guide rail or a separate straight edge but relies on the workpiece having a straight edge or reference edge and consequently cannot be used on a workpiece that does not have a finished (joined) edge nor can it be used for making angle cuts, that is, cuts not parallel to the reference edge. The guide pin that tracks the straight edge of the workpiece does not restrict lateral movement of the saw in the direction of the reference edge of the workpiece enabling the saw to deviate off the cut-line. The width of the cut is limited by the practical length of the gauge. In order to rip down the center of a sheet of plywood, the gauge would have to be in excess of twenty-four inches long, allowing for the end of the gauge that is attached to the saw plate. This would result in the drag forces acting between the reference edge of the workpiece and the guide pin to create a radial force with the guide pin contacting the reference edge of the workpiece acting as the pivot point. This would cause the tool to be turned into the workpiece causing binding and kickback. Collection of saw dust in front of the gauge restricts the movement of the gauge and further exacerbates the drag and pivotal reaction of the guide pin against the reference edge causing a rotational force that results in binding and kickbacks.

SUMMARY OF THE INVENTION

A hand power tool is mounted on a chassis which is easily constructed, rugged, reliable and light-weight. The chassis of a first embodiment of the invention incorporates a raised reference edge that the tool base is wedged against ensuring precise alignment of the tool blade or cutter to the cut-line. The tool is securely locked against the reference edge thus no alignment is necessary. The precise alignment of the tool to the cut-line ensures that the tool blade or cutter remains precisely aligned within the kerf of the cut. This enables the operator to stop the tool to reposition himself or herself for a more comfortable position around the workpiece and restart the tool to complete the operation without binding or kickback for safer operation. The tool is securely held against the referenced edge by compression spacers and cam-locked disks. Cam-lock disks overlap the edge of the tool base causing the cam-lock disks to tilt. This results in a bending force being applied, effectively locking the cam-lock disk against the tool base and preventing the tool from vibrating loose. The chassis of the first embodiment contains an edge that is shaped in the form of an inverted "L" opposite the reference edge, on which guideposts are attached hanging downwardly from the horizontal member, together constituting a guide structure or trolley. The trolley captures and the vertical member of a right angle aluminum segmented linear guide rail preventing lateral movement of the tool during operation. The operator does not need to see the cut-line during operation thereby enabling the operator to position himself or herself in a more comfortable position along side of the tool guide resulting in safer operation. The inverted "L" shape of the first embodiment trolley covers the segmented guide rail effectively minimizing the collection of sawdust among the trolley guideposts and the inverted "L" shape of the trolley with the downwardly positioned guideposts provide a clearance for the trolley guideposts to travel over the top of any minimal amounts of sawdust that may have collected on the segmented guide rail in front of the chassis, with the guideposts remaining free of sawdust, thereby preventing binding during longitudinal movement. In a second embodiment of the invention the guide rail has a tubular shaped wall or track and the chassis has a guide structure made up of a plurality of low friction guide blocks, each having cylindrically shaped grooves or recesses mating with the tubular shaped track. The tubular shape of the track is formed in the fashion of a rolled edge, the preferred method of producing the rail is by extrusion. The rolled edge does not fully complete a 360 degree circle, but rather approximates 330 degrees leaving a gap between the bottom flange of the guide rail and the rolled edge. The gap precludes the possibility of sawdust collecting at the base of the rolled edge forming a potential binding location. The guide block has a semicircular longitudinal channel that corresponds to the diameter of the tubular shaped edge; riding atop of the tubular shaped rail covering the top 180 degrees. The semicircular shaped channel in the guide blocks allows the trolley to be placed or removed at any location along the guide rail. The low friction guide blocks wipe any accumulated sawdust from the tubular shaped track. Often times lumber and sheet goods are warped or they conform to the shape of support stands such as when saw horses are on non-level ground causing a shift in the work plane across the length of the workpiece. Correspondingly, the guide rail conforms to the distorted plane when clamped on the workpiece. Unlike square or rectangular shaped rail profiles, the tubular shaped guide rail's profile does not distort when a twisting or bending force is applied enabling a non-binding straight cut on warped or bowed workpieces.

Configuring the trolley with multiple guideposts, or the two guide blocks, ensures that the trolley captures the segmented guide rail throughout all phases of the cut. A minimum of two leading guideposts, at least one near the center of the trolley and two at the rear of the trolley in the first embodiment, function to keep the chassis in alignment with the cut-line. When the chassis is placed upon the front edge of the workpiece, the two leading guideposts or the forward guide block capture the segmented guide rail establishing the initial alignment of the chassis to the cut-line before the tool is started and engages the workpiece. The trailing guideposts or guide block maintain the tool in alignment at the point where the cutter breaks free of the workpiece at the end of the cut. In both embodiments of the invention, the chassis fully contains the tool base and the chassis is fully supported by the workpiece; which prevents any tilting or rotational movement caused by lateral forces applied during operation, thereby avoiding binding or kick-back. The device of U.S. Pat. No. 5,815,931, for instances, captures only one edge of the saw base creating a condition that enables the saw to tilt during operation if a downward force is applied to the rear of the saw while operating. This can cause binding or kick-back and result in danger to the operator or an errant cut. Multiple segments of the guard rail can be joined together to accommodate various lengths of workpieces for no restriction in length of travel. The segmented guide rail controls the direction of the tool guide and does not require either parallel or straight edges on the workpiece in order to produce straight cuts and it facilitates making angular cuts across the workpiece. The segmented guide rail is clamped to the workpiece using conventional C-clamps or fast action spring clamps or any other suitable clamp for simplicity and ease of use. The segmented guide rail does not include intricate integral clamps that make the design more costly to produce, which would also preclude the joining of additional sections when needed to rip long workpieces.

The reference distance representing the offset from the guide rail to the saw blade or cutter is a constant for each tool and is taken into account when positioning the segmented guide rail to align the tool to the cut-line. This is a fixed dimension and is unique for each tool or cutter combination. My tool guide provides a positive means of controlling circular saws, saber saws and routers along a defined cut-line without needing to have the cut-line in sight or having to have rigid control of the tool and as a result there is ease of cut, no binding, kickback or errant cuts. The operator can operate the tool with either their right or left hands and can make ripping cuts down the center of a 4 by 8 foot sheet of plywood or other large sheets of work stock with ease. My tool guide functions like a panel saw but is portable and lightweight.

BRIEF DESCRIPTION OF THE DRAWINGS

The invention is illustrated by the accompanying drawings in which:

FIG. 9 is a perspective view of a second embodiment segmented guide rail and chassis;
FIG. 10 is a perspective view showing mating ends of the guide rail sections of FIG. 9;
FIG. 11 is a perspective view of the chassis of the second embodiment of the invention;
FIG. 12 is a perspective view of one of the guide blocks shown in FIG. 11;
FIG. 13 is a perspective view of an alternative guide block;
FIG. 15 is an exploded perspective view of a router mounting plate and a hole reduction insert;
FIG. 16 is a side view of the router mounting plate;
FIG. 17 is a side view of the hole reduction insert for the router mounting plate;
FIG. 18 is an exploded perspective of a circular saw mounting plate and a sacrificial zero clearance insert;
FIG. 19 is a side view of the circular saw mounting plate with the sacrificial zero clearance insert installed in the tool cutout; passing through the flush with the bottom of chassis 146.
FIG. 20 is a side view of the sacrificial zero clearance insert for the circular saw tool cutout;
FIG. 25 is a partial perspective view showing the clamp block used as a stop block to limit movement of the chassis in one direction of travel on the guide rail,
and
FIG. 26 is a perspective view showing a guide rail secured by a pair of clamp blocks to a work piece and a pair of clamp blocks mounted on the guide rail serving as stop blocks to limit fore and aft travel of the chassis on the guide rail.

DETAILED DESCRIPTION OF THE INVENTION

Figure 6:
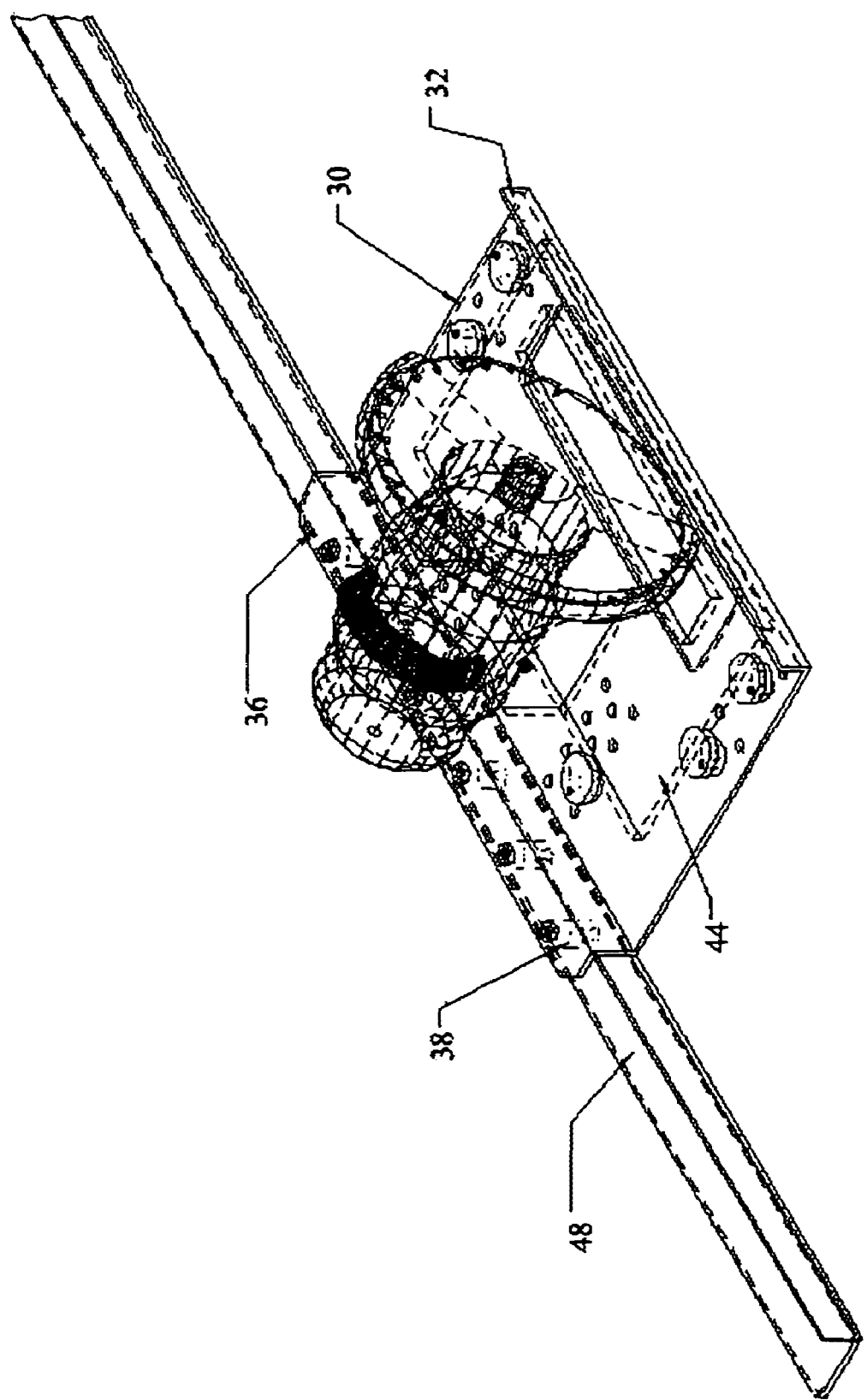
FIG. 6 is a perspective view of the tool guide mounted on the segmented guide rail.
Figure 7:
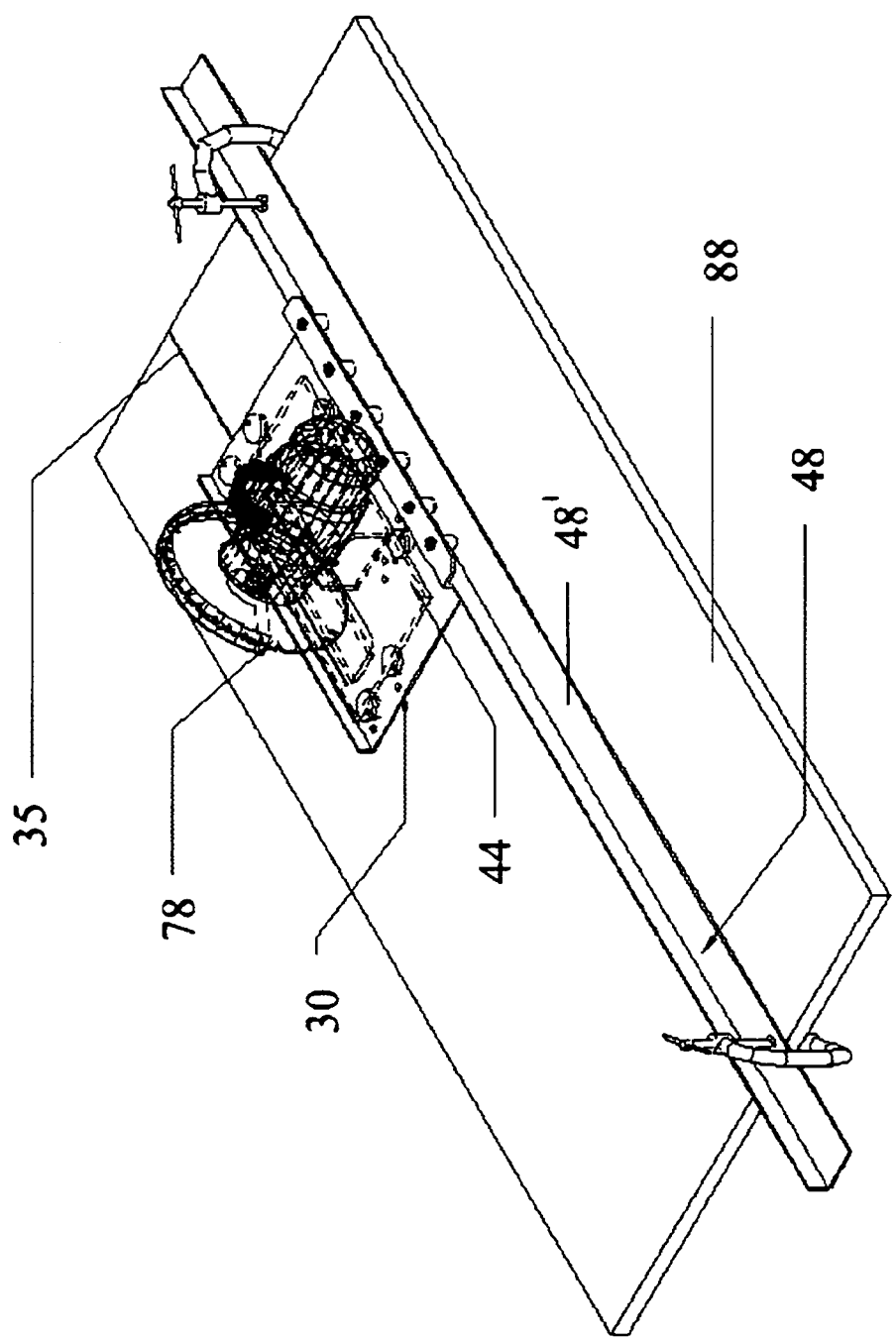
FIG. 7 is perspective views of the tool guide mounted and guide rail mounted on a workpiece.

Several embodiments of the tool guide for portable power tools are illustrated in the accompanying drawings. The set up and operation of the tool guide for precise control of portable power tools, such as circular saws, saber saws and routers is closely related. Referring to FIGS. 1 through 8, a chassis 30, to which the power saw 60, or other cutting tool, is attached, is fabricated using light weight, one-piece sheet aluminum, but can be made from malleable metal, cast or molded material. The chassis 30 includes a flat panel 30' with a cutout 31 through which a cutter or blade protrudes and a series of countersunk holes 50, spaced to accommodate various tool plates such as tool plate 44. Fixed stops 34, cam lock disks 40 and compression spacers 42 are provided for the securing and tensioning the power tool mounting plate 44 to the chassis 30; and a perpendicular vertical edge that forms an upstanding reference edge 32 is provided on the chassis for precise alignment of the cutter or blade to the cut-line. Opposite the reference edge 32, an inverted L section edge is formed parallel to the reference edge 36. The inverted L-shaped edge 36 includes a vertical wall rigidly secured to and extending vertically upward from the base of the chassis 30 and a horizontal wall or flange extending horizontally outwardly in relation to the base of the chassis. Cylindrical guideposts 38 are positioned vertically in a downward configuration from the horizontal wall of the L-shaped edge 36 and provide close tolerance capture of a vertical wall of a segmented guide rail 48. The segmented guide rail 48 is preferably an L-shaped aluminum right angle and, as shown in FIG. 7, is positioned parallel the longitudinal path of the cut-line 35 with the flat bottom of its horizontal flange 48' resting on the work piece 88 . . . .

Figure 1:
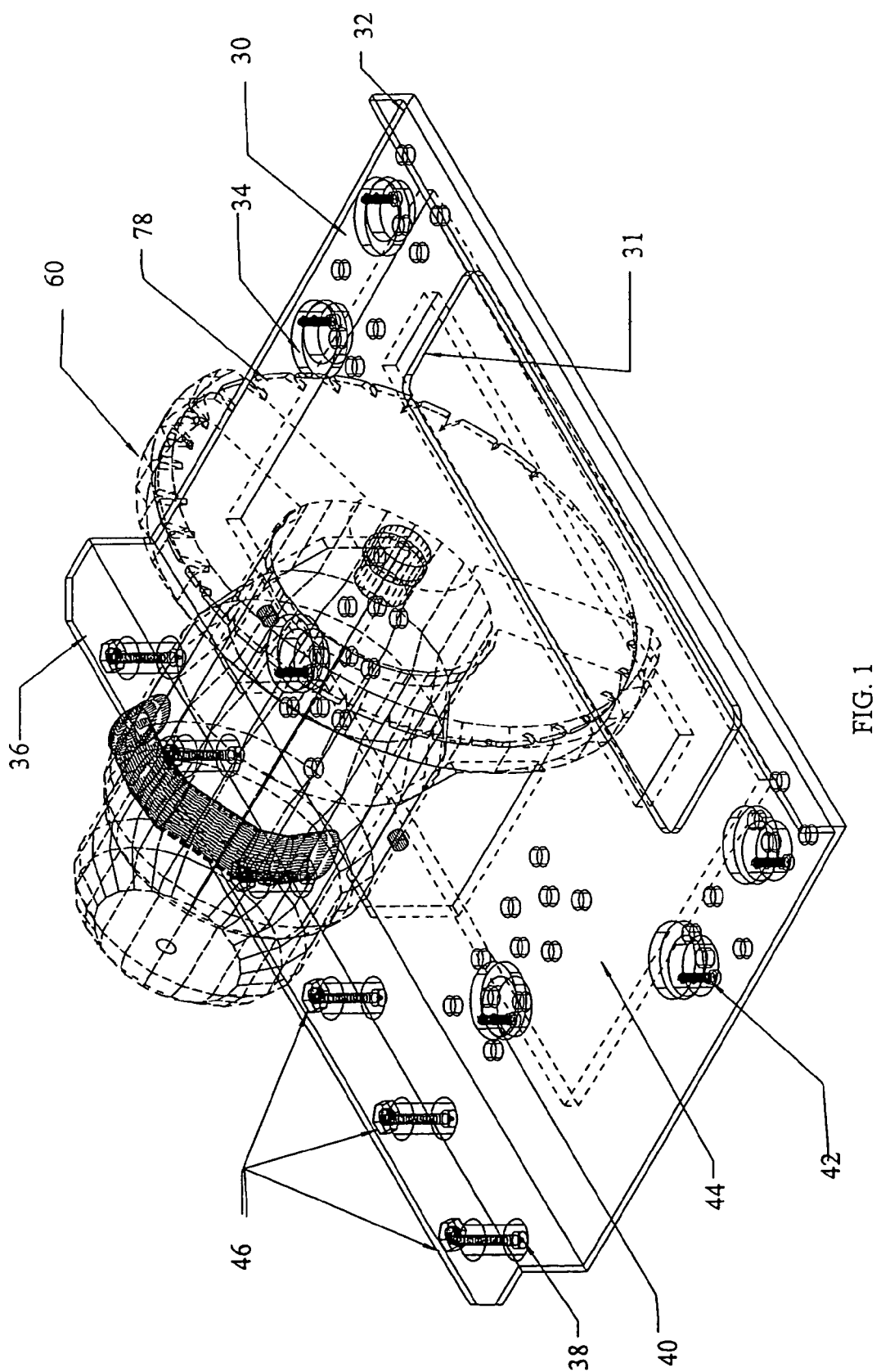
FIG. 1 is a perspective view of the chassis and tool plate.
Figure 2:
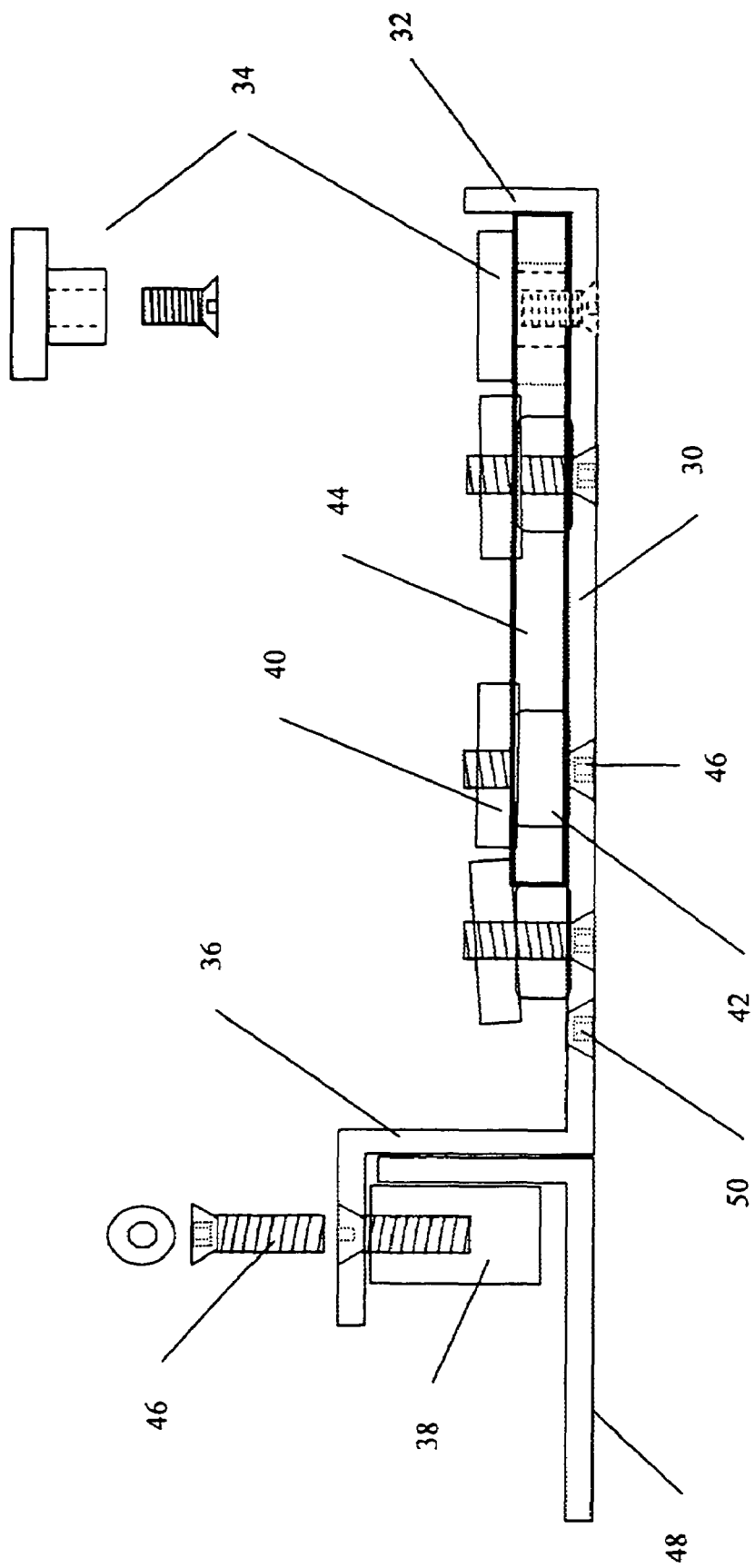
FIG. 2 is an end view of the chassis and tool plate.

As shown in FIG. 1, aligned cutouts or openings 31', 31 are machined in the chassis 30 and the tool plate 44, respectively, to accommodate the tool blade or cutter 78, which passes through the cutouts 31, 31' to cut or shape a workpiece 88. As shown in FIG. 2, a series of countersunk holes 50 are machined into the bottom panel of the chassis 30 and located such that the countersunk holes 50 will be at one side and rear of the tool plate 44. Multiple pairs of countersunk holes 50 are spaced to accommodate various sizes of tool plates 44 from the many manufacturers of saws and routers. Countersunk holes 50 are equally spaced laterally from the side of the tool plate 44 and longitudinally from the rear of the tool plate 44, such that the cam-lock disk 40 overlaps the tool base within the range of adjustment obtainable in one rotation of the cam-lock disk.

Two countersunk holes 50 are located in the chassis 30 at the front of the tool plate 44 to receive a pair of fixed stops 34 that function as bumpers that the tool plate 44 is placed against when fastening the tool to the chassis 30. Fixed stops 34 have a cylindrical body with a broader rimmed top forming a "T" shape, such that the front edge of the tool plate 44 fits under the top of the fixed stop 34 and is restricted from forward movement by the cylindrical body and from upward movement by the overlapping top of the fixed stop 34.

FIG. 2 is a cross sectional view of the chassis 30 which depicts the socket head machine screws 46, the countersunk holes 50 that receive the socket head machine screws 46, compression spacers 42 that are placed upon the threaded portion of the socket head machine screw 46 protruding above the chassis 30, the cam-lock disks 40 that is threaded upon the socket head machine screw 46 and overlaps the tool plate 44, engaging the tool base or plate 44 that is wedged against the reference edge 32 and the fixed stops 34, and the trolley 36 tracking upon the segmented guide rail 48. Cam-lock disks 40 are threaded upon the socket head machine screws 46 and rotated until the edge of the cam-lock disks 40 overlap the edge of tool plate 44 and the compression spacers 42 contact the edge of the tool base or plate 44. The cam-lock disks 40 are tightened securely using socket head machine screws 46.

Trolley 36 includes an inverted L-shaped edge of the chassis 30 and a plurality of cylindrical guideposts 38 that are positioned vertically in a downward configuration such that a predetermined gap plus nominal machine tolerance is maintained between the guideposts 38 and the outside edge of the vertical member of the trolley 36. The trolley 36 with guideposts 38 captures the vertical member of the right angle segmented guide rail 48 such that the vertical member of the segmented guide rail 48 is sandwiched between the guideposts 38 and the vertical member of the trolley 36. The guideposts 38 provide a low resistant surface for the smooth tracking of the chassis 30 and associated tool on the segmented guide rail 48.

Figure 3:
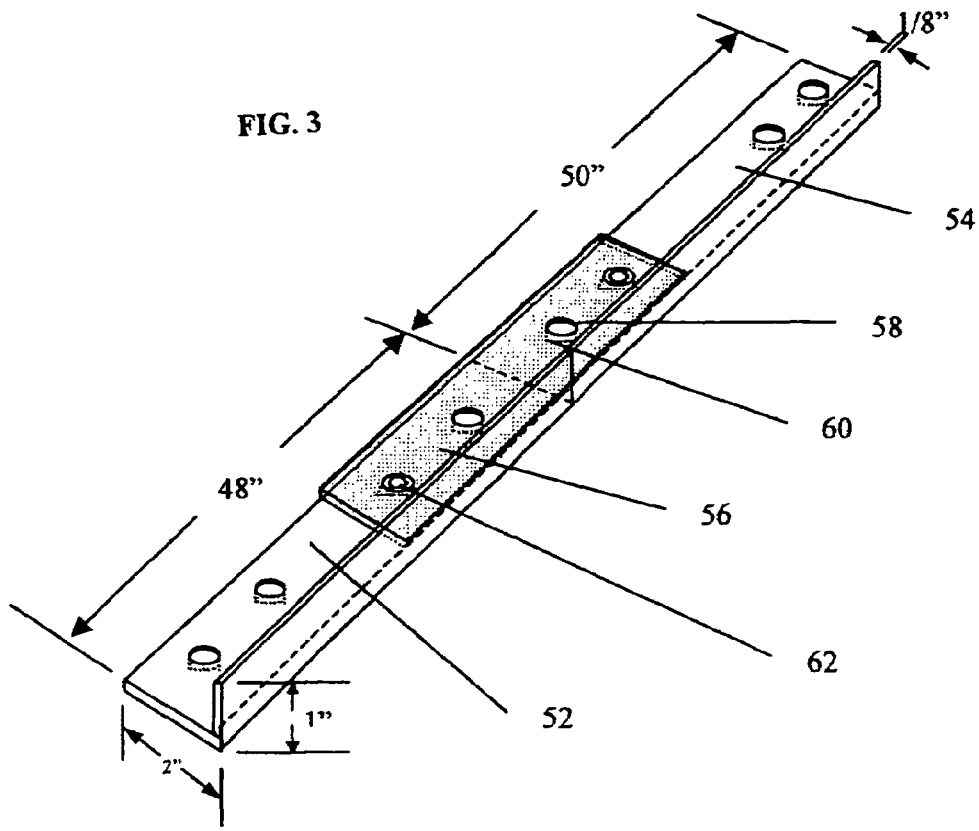
FIG. 3 is a perspective view of a segmented guide rail and attachment plate.
Figure 4:
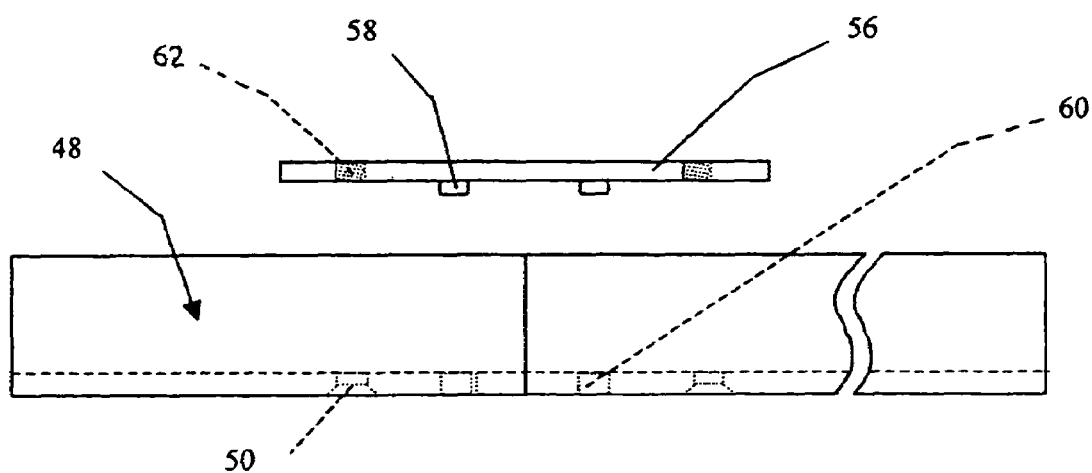
FIG. 4 is a side view of the guide rail and attachment plate, the attachment plate being shown in an exploded position.

FIGS. 3 and 4 show the segmented guide rail 48 providing a straight edge upon which the chassis 30 can advance. The segmented guide rail 48 is nominally a 2×1×⅛-inch right angle aluminum or other suitable material that provides sufficient rigidity to maintain a straight edge while nominal lateral force being applied during operation. During operation, the major component of force is applied to the chassis in the longitudinal direction to advance the chassis along the cut-line; however, with the operator positioned along side of the tool during operation, a nominal lateral force is to be expected.

The segmented guide rail 48 is composed of two segments, a 48-inch segment 52 and a 50-inch segment 54 of 2×1×⅛-inch angle aluminum. The 50-inch segment 54 facilitates cross cutting or ripping up to a 48-inch long workpiece while providing an overhang of one inch at the front and rear edges of the workpiece. This is sufficient length to capture at least two guideposts 38 of the trolley 36 before the tool blade 78 engages the workpiece 88. The overhang of the guide rail at the end of the cut in the workpiece 88 ensures that the trolley remains in contact with the segmented guide rail until the tool blade or cutter 78 has moved beyond the workpiece 88 completing the operation. The segments 52 and 54 are joined together using an attachment plate 56. When joined together the resultant length of the segmented guide rail 48 is 98-inches, which facilitates ripping up to a 96" long workpiece 88 with adequate overhang of segmented guide rail 48 as discussed above. The attachment plate 56 has two depressions, referred to as buttons 58 that protrude from the bottom of the attachment plate 56. The buttons 58 fit snuggly within two alignment holes 60 in the segmented guide rail 48. The buttons 58 can only be inserted in the alignment holes 60 when the segments 52 and 54 of the segmented guide rail 48 are tightly butted against each other, thereby ensuring a perfectly straight alignment of segments 52 and 54. The attachment plate protrusions and countersunk holes are offset from the centerline running longitudinally, causing the attachment plate to forcibly engage the vertical member of the guide rail. When the protrusions of the attachment plate are mated with the receptors in the guide rail segments and secured with the threaded fasteners, the attachment plate rigidly aligns the joined segments of the guide rail in a straight line orientation along the line of cut.

The preferred embodiment for the segmented guide rail 48 utilizes 2×1×⅛-inch right angle aluminum, due to its rigidity and ability to maintain a straight edge under nominal forces applied by the operator during movement of the chassis 30 along the segmented guide rail 48. However, the design of the trolley 36 and guideposts 38 enables the use of 1×1×⅛-inch angle aluminum that is readily available as over-the-counter stock at most hardware stores or retail home centers and is available in various lengths. This provides flexibility for the woodworker to make fixtures and gigs needed for custom operations using readily available and inexpensive materials.

Figure 5:
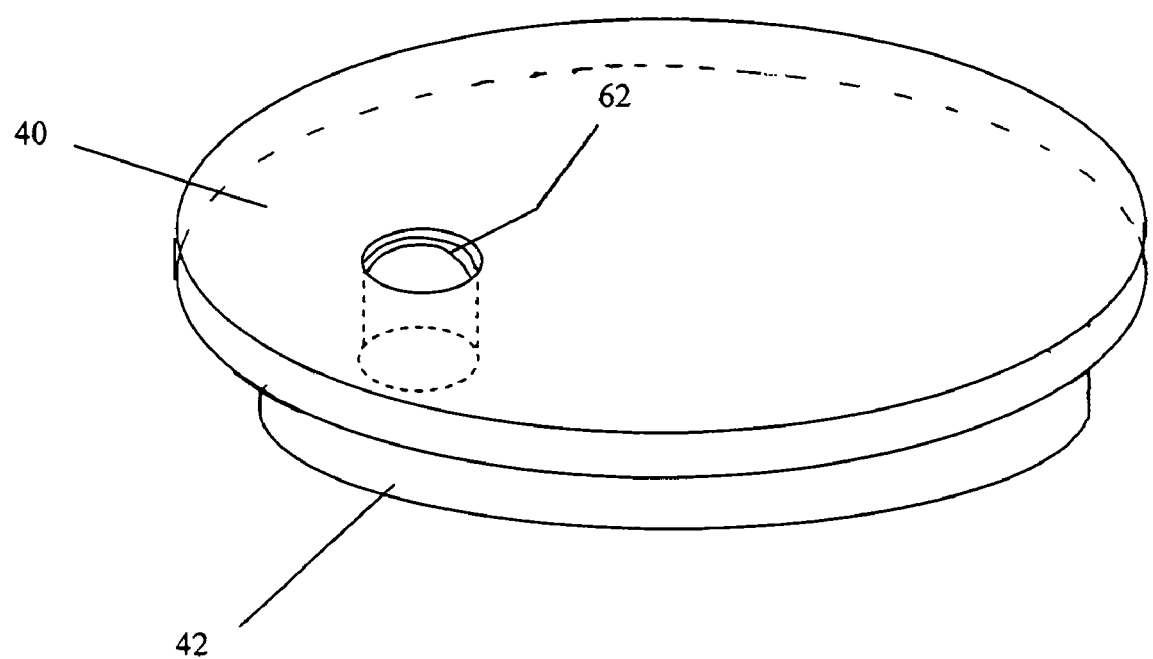
FIG. 5 is a perspective view of a cam-lock disk and compression spacer.

FIG. 5 is an isometric view of the cam-lock disk 40 and compression spacer 42. The cam-lock disk 40 has a threaded hole 62 that receives one of the socket head machine screws 46. The threaded hole 62 is offset from the center of cam-lock disk 40. The offset of the threaded hole 62 from the center of the cam-lock disk 40 provides a range of adjustment of the cam-lock disk 40 that exceeds the spacing of the countersunk holes 50 evenly spaced in the chassis 30, sufficient to engage the tool plate 44. The compression spacer 42 is narrower in diameter that the cam-lock disk 40. This results in the cam-lock disk 40 overhanging the compression spacer 42 around the circumference of the cam-lock disk 40. When attaching a tool to the chassis 30, the tool plate 44 is placed against reference edge 32 and against fixed stops 34. Two countersunk holes 50 located in chassis 30 are selected at the side of the tool plate 44 opposite the reference edge 32 that are closest to the tool plate 44 and two countersunk holes 50 are selected at the rear of the tool plate 44 that are closest to the tool plate 44.

As shown in FIG. 5, the socket head machine screw 46 is inserted up through a selected countersunk hole 50 in the chassis 30. The compression spacer 42 is placed over the socket head machine screw 46 and the cam-lock disk 40 is threaded onto the machine screw 46. The compression spacer 42 is rotated such that it contacts the edge of the tool plate 44 and the cam-lock disk 40 is positioned such that it overlaps the tool plate 44. The socket head machine screw is tightened securely using an appropriately sized wrench. The socket head machine screw 46 is used because it provides a positive, non-slip means of applying sufficient force to create a bending force to the cam-lock disk 40. The bending force results in the cam-lock disk 40 tilting and compressing the compression spacer 42. The compression spacer 42 is compressed and expands against the side of the tool plate 44. The tilting of the cam-lock disk 40 applies a torque to the socket head machine screw 46 increasing the component of friction between the machine screw 46 threads and the threads in hole 62 of the cam-lock disk 40. The resulting torque or bending force being applied prevents the cam-lock disk 40 from vibrating loose. With the tool plate 44 positioned against the reference edge 32 and secured with the cam-lock disk 40 and the compression spacer 42, the tool plate 44 is locked to the chassis 30 in perfect alignment with the cut-line. These are significant factors incorporated into the embodiments of the present invention as compared to the prior art that typically uses thumb screws and wing-nut bolts and a variety adjustable means to align the saw to the cut-line. The tool guide eliminates the need for alignment and reduces the hazard associated with a power tool becoming loose and moving out of alignment during operation. FIGS. 6 and 7 depict the final configuration of the guide for the precision control of portable power tools positioned on the segmented guide rail 48 releasably secured to the workpiece 88.

Figure 8:
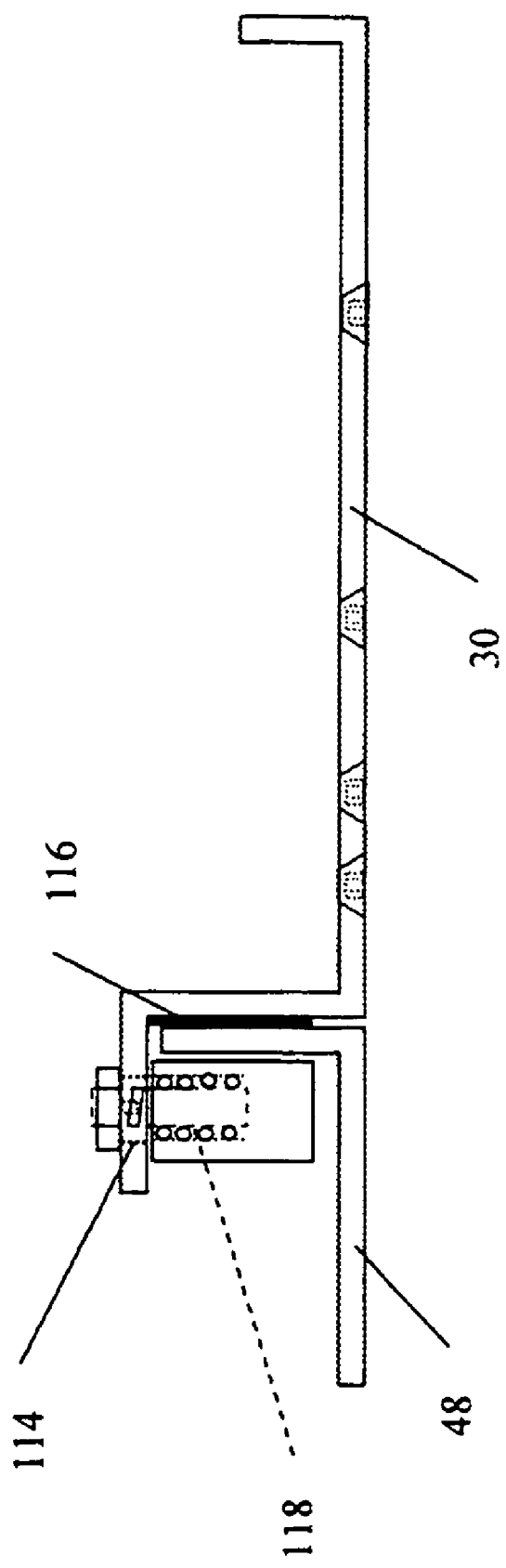
FIG. 8 is an end view of the chassis depicting an alternate embodiment having adjustable roller bearing and wear strips applied to the trolley.

Referring to FIG. 8, the trolley includes a low friction replaceable wear strip 116 on the lateral side of the vertical wall of the trolley 36 making contact with the vertical flange of the L shaped guide rail 48. The wear strip 116 may be made of TEFLON material of DuPont Corporation or a similar friction reducing material. In order to further reduce friction, roller bearing posts 118 replace the non rotating guideposts 38. The cylindrical roller bearing posts 118 reduce friction and provide longer wear life. The chassis 30 may be made of a casting, thereby reducing or eliminating machining and forming costs.

After embodiments of the portable guide for hand held power cutting tools are illustrated in FIGS. 9-26. A segmented guide rail 130 includes at least two sections 131. The rail section 131 may be formed from a single piece of relatively thin material such as aluminum and has an elongated flat bottom 132 adapted to rest on the work piece and edges curled cylindrically upward to form a pair of parallel linear guide tracks 133, 133' having upward and radially outward facing cylindrical guide surfaces 134, 134' and cavities with cylindrically shaped interior surfaces 136, 136'. Adjacent ends of the rail sections 131 are interconnected by a pair of cylindrical pins 137 which have a snug or light press fit in the confronting ends of the cavities formed by the radially inward facing cylindrically formed surfaces 136, 136'. The end to end rail sections 131 are also interconnected by a cap screw 141 which passes through aligned openings in upstanding tabs 142, 144, or abutting ends of the rail sections 131 and threaded into a nut 143. The pins 137 and connecting parts 141, 142, 143, 144 provide a draw-tight butt joint. Since the cutting tool is often used to cut the full length of an 8 foot long sheet of plywood or the like, the rail section 131 may be longer than 48 inches. Since the rail section 131 is identical in construction, several may be joined for longer cuts. The segmented guide rail shown in FIGS. 9 and 10 has a profile consisting of a flat base and two rolled edges 133, 133'. The segmented guide rail can be extruded or fabricated from flat stock. The rolled edge provides for a much stiffer rail than the L-shaped rail. Tests confirmed that the rolled edge rails result in a straighter cut producing as much as a factor of 4 improvements in the amount of deviation off centerline of the cut line.

A chassis 146 shown in FIGS. 9 and 11 has a flat panel 147 having a T-shaped opening 148 made up of an elongated slot 149 extending in a fore and aft direction parallel to the guide rail 130 and a transverse slot 151. The elongated slot 149 near one lateral side of the chassis 146 accommodates the blade and blade guard of a circle saw and the slot 151 accommodates the cutter of a router or other tool, such as a saber saw. The use of cylindrically surfaced guide rails gave rise to a new trolley design using slide blocks. FIGS. 9 and 11 show a chassis 146 with two guide blocks 161, 162 attached. The trolley is formed at the edge of the side of the chassis 146 opposite the slot 149 by a pair of inverted L shaped flanges 166, 167 having horizontal walls 163, 164 supporting the blocks 161, 162 on their underside. The bottoms of the vertical walls 168, 169 of the flanges 166, 167 are rigidly secured to the edge of the flat panel 147. The flanges 166, 167 and flat bottom 147 may be formed from a single piece by appropriately bending the inverted L shaped flanges 166, 167. The aligned L shaped flanges 166, 167 are spaced from one another to provide vertical clearance for the motor of a hand held circular saw when it is mounted on the chassis 146. The gap allows the motor of the circular saw to be lowered onto tool base 44 or the guide track depending on the axially length of the motor. The guide blocks 161, 162 are made of self lubricating plastic and are rigidly secured to the horizontally flanges 163, 164 by appropriate fasteners 171, such as cap screws, washers and nuts. The guide blocks 161, 162 have 180° radially inward facing cylindrically shaped surfaces 166', 167' which face downwardly and mate with the upward facing cylindrical surfaces 134 134' forming cylindrically shaped tops on the guide tracks 133, 133'. As shown in FIGS. 11 and 12, the guide blocks 161, 162 have chamfered top edges 176, 177 to provide clearance for the bend radius of the flanges 166, 167. FIG. 13 shows an alternate guide block 178 having a cylindrical groove 179 with a plurality of circumferentially spaced, axially extending ridges 180 which reduce friction.

Figure 14:
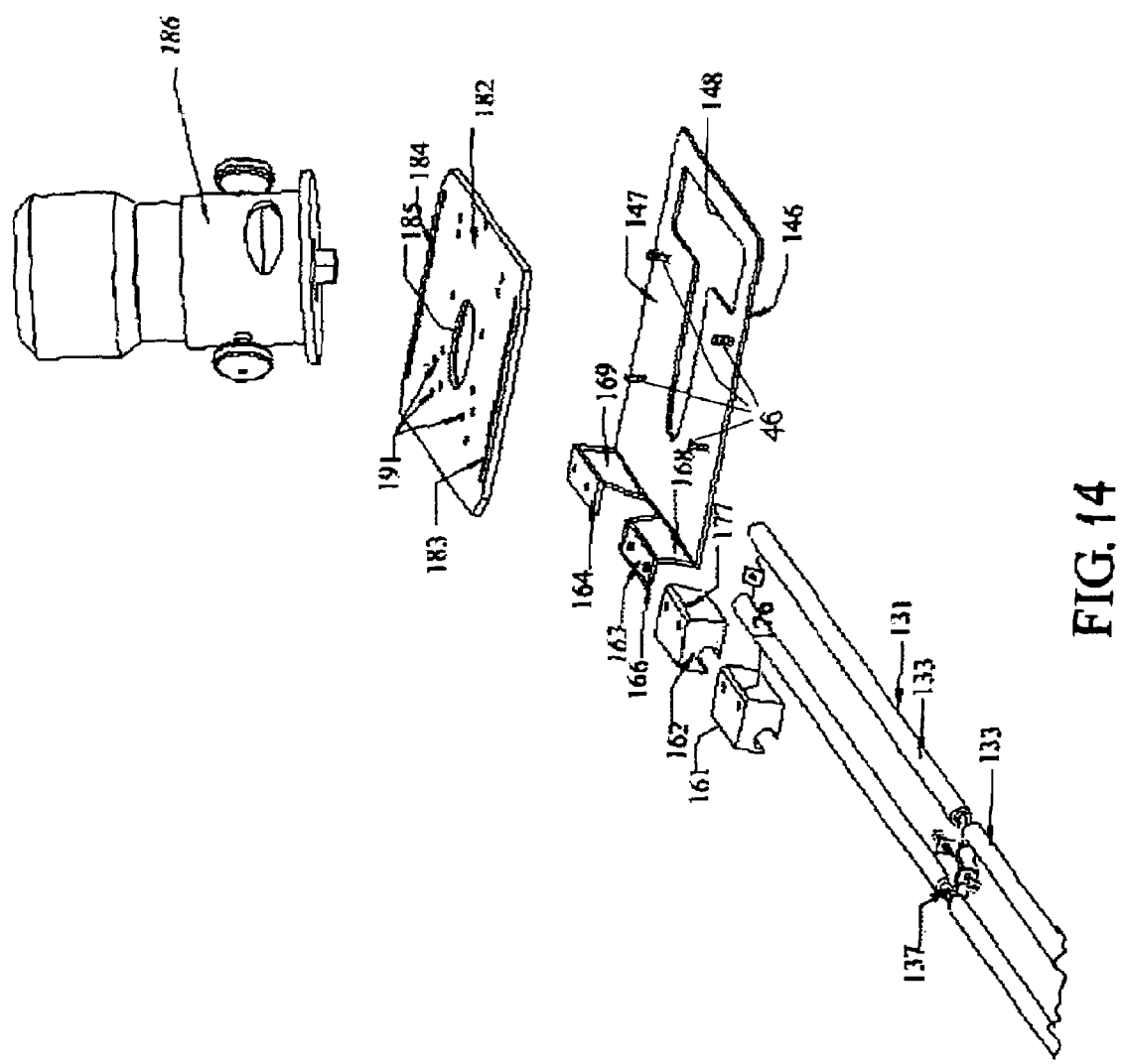
FIG. 14 is an exploded perspective view of the second embodiment guide rail, a router, a router mounting plate, a chassis and the chassis guide blocks.
Figure 21:
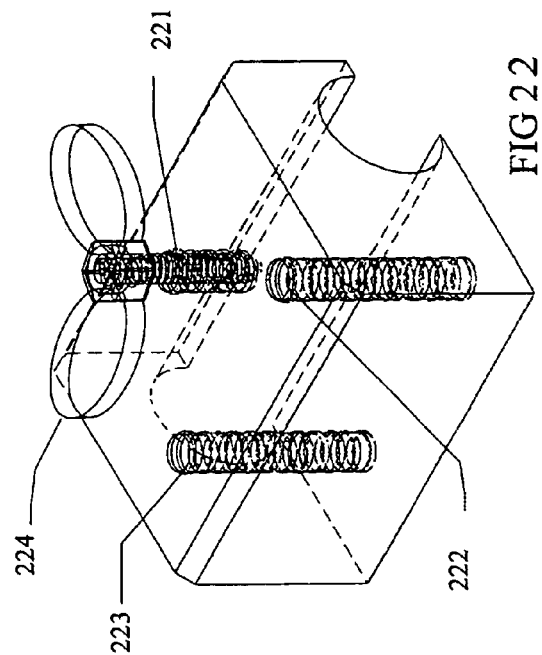
FIG. 21 is a perspective view of a clamp block.
Figure 22:
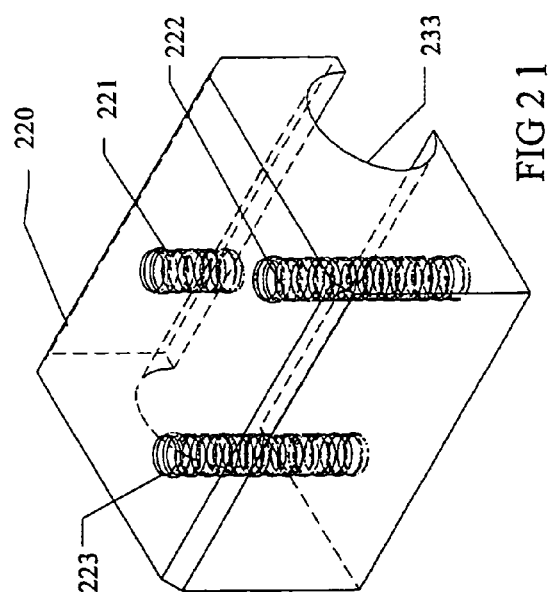
FIG. 22 is a perspective view of the clamp block with a thumb screw.
Figure 23:
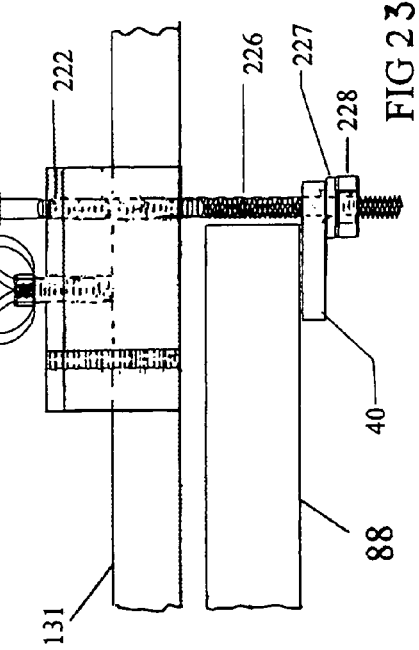
FIG. 23 is a partial side view showing the clamp block at the commencement of clamping a guide rail to a work piece.
Figure 24:
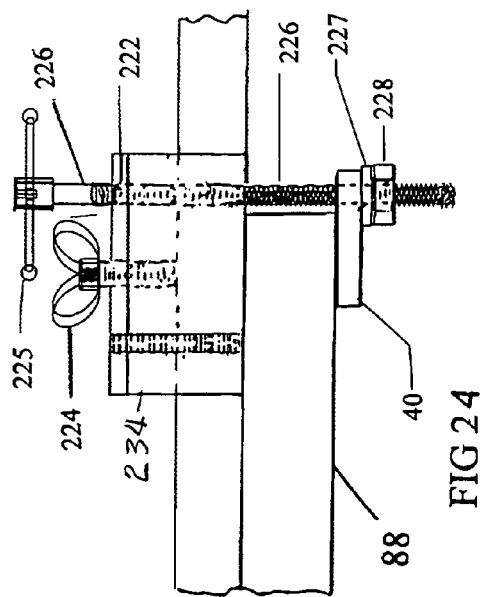
FIG. 24 is a partial side view showing the guard rail secured to the work piece.

FIG. 14 is an exploded perspective view showing a router mounting plate 182 which has parallel slots 183, 184 near its front and rear edges. Tapered socket head screws 46 extend upward through openings 229, shown in FIG. 11, in the flat panel 147 of the chassis 146. The screws 46 pass through the slots 183, 184 when the router mounting plate 182 is lowered on to the flat panel 147. Appropriate wing nuts, not shown, or other threaded fasteners are then used to secure the router mounting plate in the desired position. The slots 183, 184 permit adjustment for desired additional cuts without changing the position of the guide rail 130. The router 186, or other selected power tool, is secured to the router mounting plate 182 by socket head screens and nuts, cam lock discs or other fasteners, not shown, prior to fastening the mounting plate 182 to the flat panel 147 of the chassis 146. Appropriate holes 191 are formed in the router mounting plate to mount routers, saber saws and the like.

Referring to FIGS. 15, 16 and 17, the router mounting plate 182 provides a means for simplifying the removal and placement of various power tools onto chassis 146. Select tools are attached to their respective mounting plates, which then can be attached to chassis 146 using two screws 46 that pass through holes 229 in chassis 146 and through holes 198 in circular saw mounting plate 232 or through slots 183 and 184 in the router mounting plate. FIG. 19 is a cross sectional view of zero clearance insert 202 inserted in chassis 146 and captured by circular saw mounting plate 232 may be provided with a removable hole reduction insert or collar in the form of an annulus or ring 199 having a smaller inside diameter than the stepped diameter tool opening 185. The ring 199 has a stepped diameter periphery on its circumference which is complimentary to the stepped diameter opening 185. The ring 199 is releasably secured to the router mounting plate by three small flathead machine screws 201. FIG. 16 shows the insert 199 installed in the router mounting plate 182. The stepped diameter ring shaped insert 199 reduces the size of the opening 185 around the router cutter thereby providing as much support as possible for the workpiece when working with small workpieces close up to the edge of the sharp, high speed cutter. Router insert 199 can be removed when using large diameter router cutters.

As shown in FIGS. 18 and 19, a sacrificial insert 202 is insertable in the opening 204 the circular saw mounting plate 232 through which the circular saw blade is lowered when making a cut. The sacrificial insert 202 has a stepped periphery contacts the surface of the workpiece thus preventing tear-out, fraying or splintering of fibrous woods when the saw blade cutting edge travels upwards through the wood then through sacrificial insert 202. Appropriate openings 190 may be formed in the circle saw mounting plate 232 shown in FIG. 20, for screws or other fasteners for mounting different manufacturers circle saws. Two holes 198 are provided in circular saw mounting plate 232 which align with holes 229 in chassis 146, which are securely fastened with screws 46. The alignment of holes 229 in chassis 146 with holes 198 in circular saw mounting plate 232 ensures that reference edge 203 is in perfect alignment with the cut-line. The chassis of the first embodiment of the invention incorporates a raised reference edge 32 that the tool base 44 is wedged against ensuring precise alignment of the tool blade or cutter to the cut-line. Circular saw mounting plate 232 of the second embodiment of the invention incorporates the same reference edge 203 as reference edge 32 of the first embodiment as well as the same configuration of holes 198 as holes 50 of the first embodiment for the attachment of cam-lock disks 40 and spacers 42. The circular saw is attached to the circular saw mounting plate in the same manner as in the first embodiment of the invention to ensure the precise alignment of the tool blade or cutter to the cut-line.

FIGS. 21 through 26 depict the construction of clamp blocks, 234 and stop blocks 220 that are similar in size and shape to guide blocks 161 and 162. The basic block has a cylindrical channel 233 running along its length that corresponds to the rolled edge of the guide rail 131. Unlike guide blocks 161 and 162 the cylindrical channel 233 of the stop and clamp blocks more completely encompasses the rolled edge of guide rail 133 to an extent of about 330 degrees. It is necessary that the stop and clamp blocks capture the guide rail rolled edge to counter the forces applied by the thumbscrew 224 or hand screw 226. The screw 226 with a handle 225 has a threaded engagement with a vertical threaded opening 222 in clamp block 234.

The guide track 133 and complimentary guide blocks 161, 162 provide accurate tool guidance even when the work piece is warped. In other words, even if the guide rail 130 is twisted due to the warped condition of the work piece to which it is attached by clamps, there is no binding of the guide blocks 161, 162 on the track 133. The stop blocks 220 facilitate accurate commencement and termination of a cut. Spacing of the guide blocks 161, 162 accommodates the circle saw motor, thus providing a maximum depth cut.

Both the circle saw mounting plate 232 and the router mounting plate 182 are releasably secured to the base 147 of the chassis 146 by screws 46. A variety of holes 190 are formed in the power saw mounting plate 232 to facilitate mounting of various circular saws and a variety of holes 191 are provided in the router mounting plate 182 for mounting various routers, saber saws and the like. The slots 183, 184 in the router mounting plate 182 allows adjustment perpendicular to the line of cut. A quality cut that is straight and chatter free can only be made by a router when small amounts of material are removed with each pass. The slots 183, 184 in the router mounting plate 182 permit the router 186 and its mounting plate 182 to be repositioned without repositioning the guide rail 130 for each pass. This feature greatly reduces the time required for the router work.

What is claimed is:

1. A portable guide mechanism for linearly guiding a hand held tool having a power driven cutter relative to a horizontally disposed work piece comprising:
   a linear guide rail having
      a flat bottom flange adapted to rest on and be releasably secured to said work piece and
      first and second parallel walls extending upwardly from laterally opposite sides of said flat bottom flange, said first and second walls being cylindrically shaped to present a pair of parallel guide tracks each having a 180° of upward facing surface and
   a chassis including
      a flat panel having
         a horizontal bottom surface adapted for sliding engagement with said work piece,
         a top surface adapted for securely mounting said hand held power driven cutting tool and
         an opening through which said cutter extends when cutting said work piece and
      a guide structure secured to one side of said chassis having a pair of horizontally spaced self lubricating plastic guide blocks spaced horizontally from one another in the linear direction of said guide rail, said blocks having a semi-circular surfaces complimentary to and slidingly engageable with said upward facing surfaces of said tracks to guide said chassis linearly during cutting of said work piece, said linear guide rail and said guide structure having a configuration permitting said chassis to be lowered onto said guide tracks and said work piece when initiating a cut in said workpiece other than at its periphery.

2. The portable guide mechanism of claim to 1 wherein said guide blocks are spaced from one another a sufficient distance to permit the lower part of a circular saw motor to be disposed there between when used with said guide mechanism to cut said work piece.

3. The portable guide mechanism of claim 1 wherein said guide rail is segmented into at least two aligned sections with adjacent ends connected by dowels inserted into aligned confronting annular openings formed by said tracks.

4. The portable guide mechanism of claim 3 having releasable connections interconnecting said aligned sections of said guide rail.

5. The portable guide mechanism of claim 1 including a pair of releasable fasteners securing said guide rail to opposite edges of said work piece, each of said releasable fasteners including a clamping block having a downwardly open cylindrically shaped channel complimentary to said cylindrically shaped track and a vertically disposed opening spaced laterally from said channel and extending between the top and bottom of said block, an adjustable connector extending through said vertically disposed opening and an arm on the lower end of said connector engageable with the underside of said work piece, said connector being vertically adjustable relative to said clamping block.

6. The portable guide mechanism of claim 1 including a tool mounting plate detachably secured to said flat panel.

7. The portable guide mechanism of claim 1 including a cutting tool mounting plate releasably secured to said panel of said chassis and having a cutting tool access opening extends when said tool is mounted on said plate, said opening in said mounting plate being aligned with larger than said opening in said panel of said chassis thereby forming a composite opening with a stepped periphery, and a sacrificial insert complementary in shape to and disposed in said composite opening.

8. The portable guide mechanism of claim 1 wherein said opening in said flat panel is T shaped with the top of the T extending in a direction parallel to said linear guide track and a leg of said T extending at a right angle to said linear guide track, and including
 a first pair of spaced fasteners connected to and extending upwardly from said flat panel defining a first line perpendicular to said track,
 a second pair of spaced fasteners connected to and extending upwardly from said flat panel defining a second line perpendicular to said track and parallel to said first line, said lines being on opposite sides of said leg of said T shaped opening,
 a cutting tool mounting plate having a tool opening through which the cutter of the tool extends when the tool is mounted on said plate and a pair of parallel slots on opposite sides of said tool opening through which said fasteners extend when said cutting tool mounting plate is positioned on top of said panel aligning said tool opening with said leg of said T shaped opening in said panel, said slots and fasteners permitting said tool mounting plate and to be adjusted relative to said panel in a direction at right angles to said guide track.

9. The portable guide mechanism of claim 8 wherein said tool opening in said cutting tool mounting plate is a stepped diameter opening with the bottom diameter being greater than the top diameter and further comprising an annular insert releasably secured to said cutting tool mounting plate with a central tool access opening and a stepped diameter circumference complementary to said stepped diameter opening.

10. A portable guide mechanism for linearly guiding a hand held tool having a power driven cutter relative to a horizontally disposed work piece comprising:
 a linear guide rail having
  a flat bottom flange adapted to rest on and be releasably secured to said work piece and
  first and second parallel walls extending upwardly from laterally opposite sides, respectively, of said flat bottom flange, said parallel walls having cylindrically shaped tops presenting a pair of parallel tracks with 180° of upward facing surface,
 a chassis including
  a flat panel having
   a horizontal bottom surface adapted for sliding engagement with said work piece,
   a top surface adapted for securely mounting said hand held power driven cutting tool and
   an opening through which said cutter extends when cutting said work piece and
  a guide structure secured to one side of said chassis having a pair of horizontally spaced self lubricating guide blocks spaced horizontally from one another in the linear direction of said guide rail, said guide blocks having semicylindrical surfaces complementary to said cylindrical of said shaped tops, respectively, said guide blocks being engageable with said guide track to guide said chassis linearly during cutting of said work piece, said linear guide track and said guide structure having a configuration permitting said chassis to be lowered onto said guide track and said work piece when initiating a cut in said work piece other than at its periphery.

11. The portable guide mechanism of claim 10 wherein said opening in said flat panel is T shaped with the top of the T extending in a direction parallel to said linear guide rail and the leg of the T extending at a right angle to said linear guide rail.

12. The portable guide mechanism of claim 10 wherein said guide blocks are made of self lubricating plastic.

13. The portable guide mechanism of claim 10 wherein said guide blocks are spaced from one another a sufficient distance to permit the lower part of a circular saw motor to be disposed there between when used with said guide mechanism to cut said work piece.

14. The portable guide mechanism of claim 10 wherein said guide blocks are releasably secured to said guide structure.

* * * * *